United States Patent [19]

Ma et al.

[11] Patent Number: 5,154,823

[45] Date of Patent: Oct. 13, 1992

[54] FILTER APPARATUS AND DISTRIBUTOR PLATE THEREFOR

[75] Inventors: Jack Ma, Cerritos; Ryan K. Hur, Irvine, both of Calif.

[73] Assignee: Woon-Hawk Engineering Plastics, Inc., Costa Mesa, Calif.

[21] Appl. No.: 785,303

[22] Filed: Oct. 30, 1991

[51] Int. Cl.⁵ .............................................. B01D 35/30
[52] U.S. Cl. ................................... 210/232; 210/282; 210/542; 210/542
[58] Field of Search .............. 210/232, 541, 542, 238, 210/282

[56] References Cited

U.S. PATENT DOCUMENTS

| | | | |
|---|---|---|---|
| 3,540,594 | 11/1970 | Sanderson | 210/232 |
| 3,846,626 | 12/1969 | Close | 210/232 |
| 4,192,750 | 3/1980 | Elfes et al. | 210/232 |
| 4,735,716 | 4/1988 | Petrucci et al. | 210/232 |
| 5,035,797 | 7/1991 | Janik | 210/232 |

Primary Examiner—Stanley S. Silverman
Assistant Examiner—C. Nessler
Attorney, Agent, or Firm—F. Eugene Logan

[57] ABSTRACT

A filter apparatus and distributor plate therefor of the quick-change type which are easily fabricated from plastic material by injection molding are disclosed. The distributor plates which are flangeless can accommodate one, two, three or more canisters. The canisters which are neckless have two prong-like arcuate member with flanges. The prong-like members extend through the distributor plate and the canisters are secured to the distributor plate by locking knobs which have mating flanges for engaging the flanges on the prong-like members. Opposing ports in the canisters and distributor plate are seal by O-rings which are housed on the flat top surface of the canisters. For filter apparatuses having more than one canister, the distributor is preferably made in two parts, namely a main body part and an insert part which are bonded into a single unitary part by sonic welding. Since the filter apparatuses of this invention have canisters that do not have necks, problems associated with seals around ports on necks are circumvented. Likewise, since the filter apparatuses of this invention have distributor plates that do not have flanges, problems associated with damage to flanges on distributor plates are circumvented. The plate-like configuration of the distributor plates and locking knobs facilitate injection molding and reduce the amount of plastic required and post injection molding machining.

20 Claims, 15 Drawing Sheets

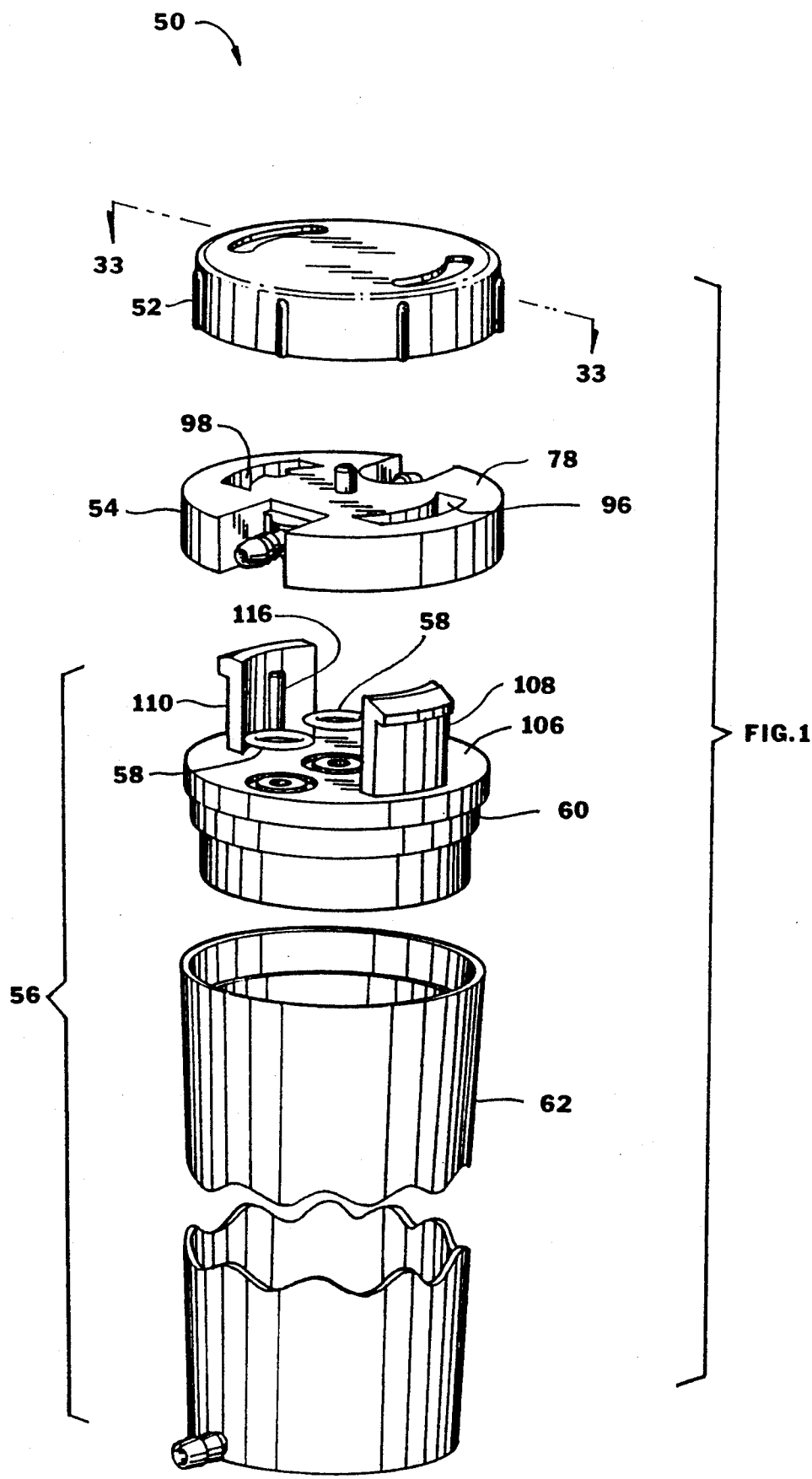

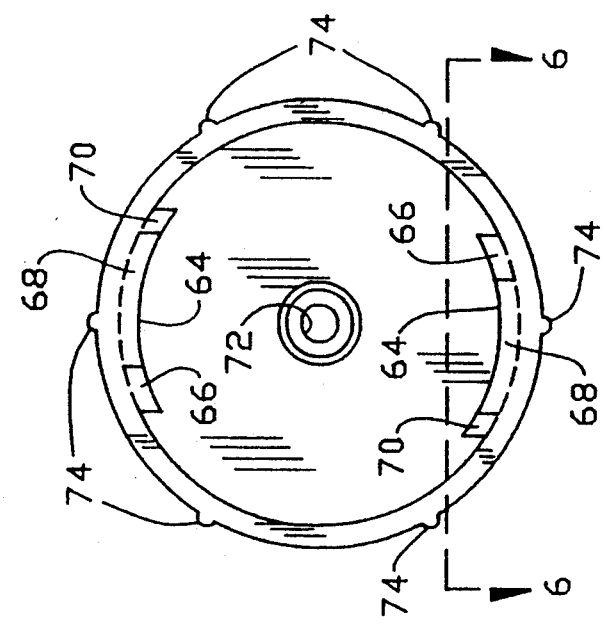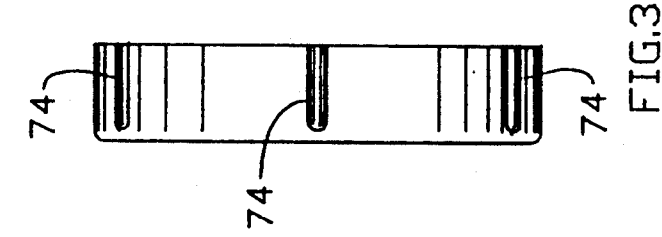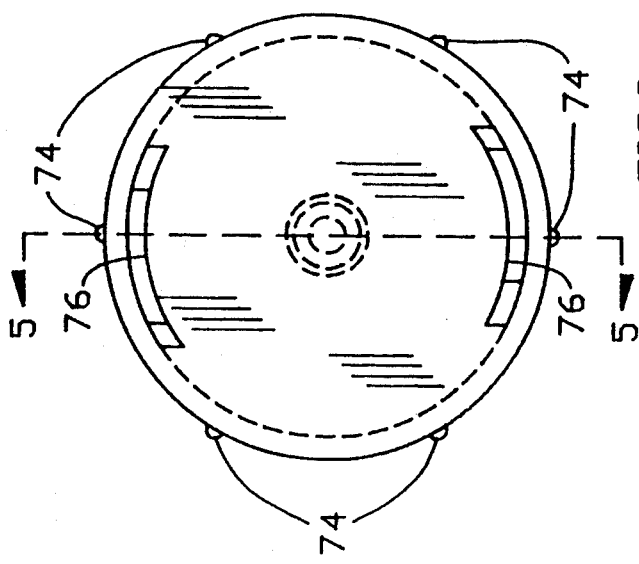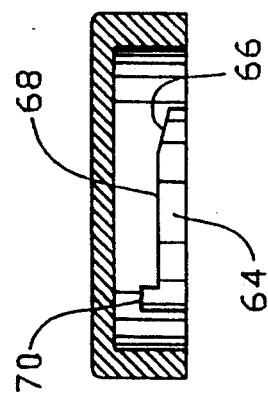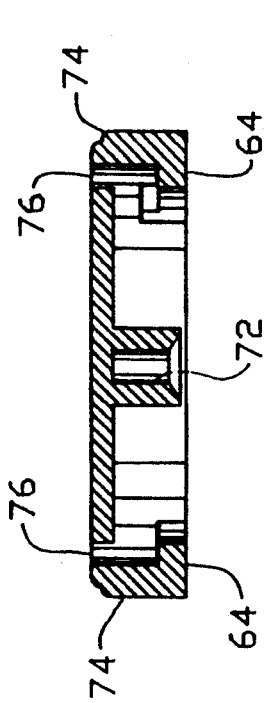

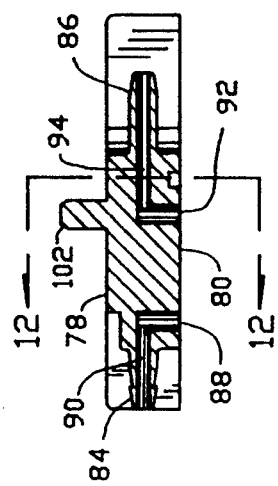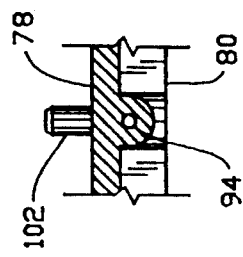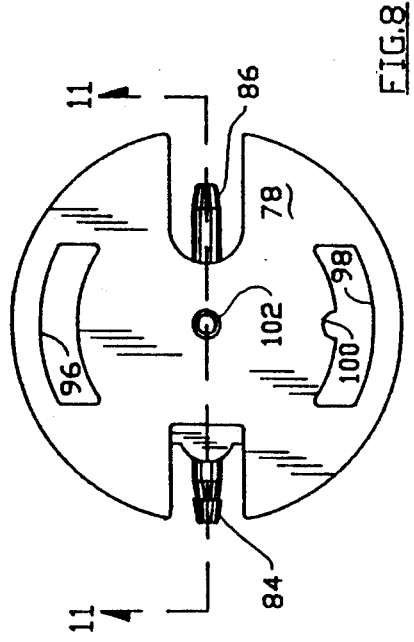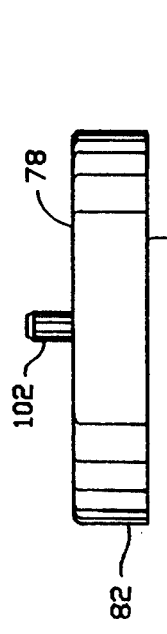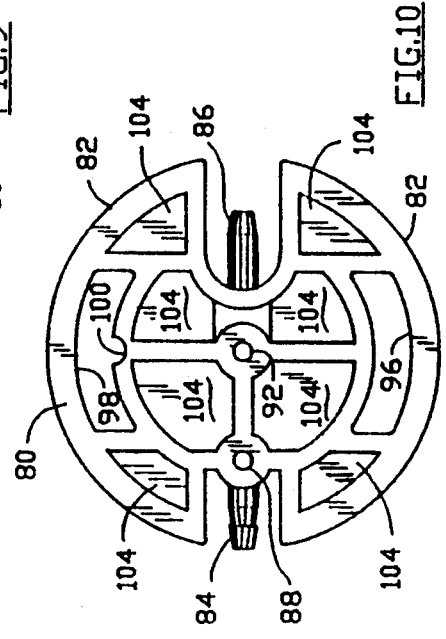

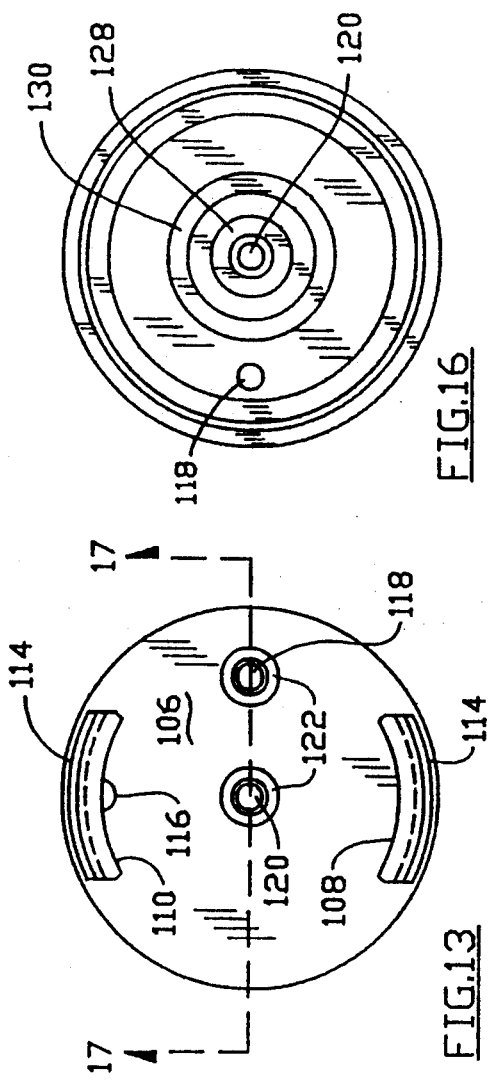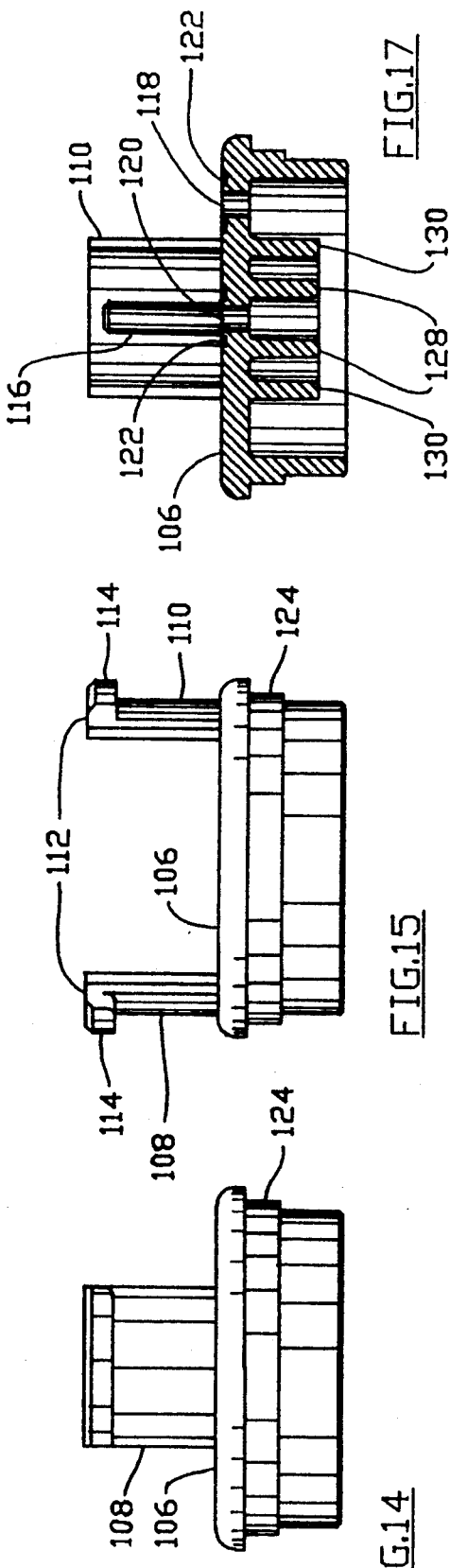

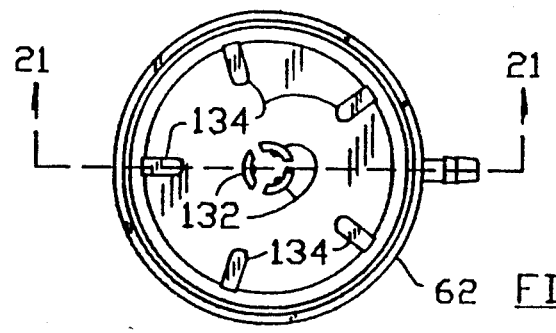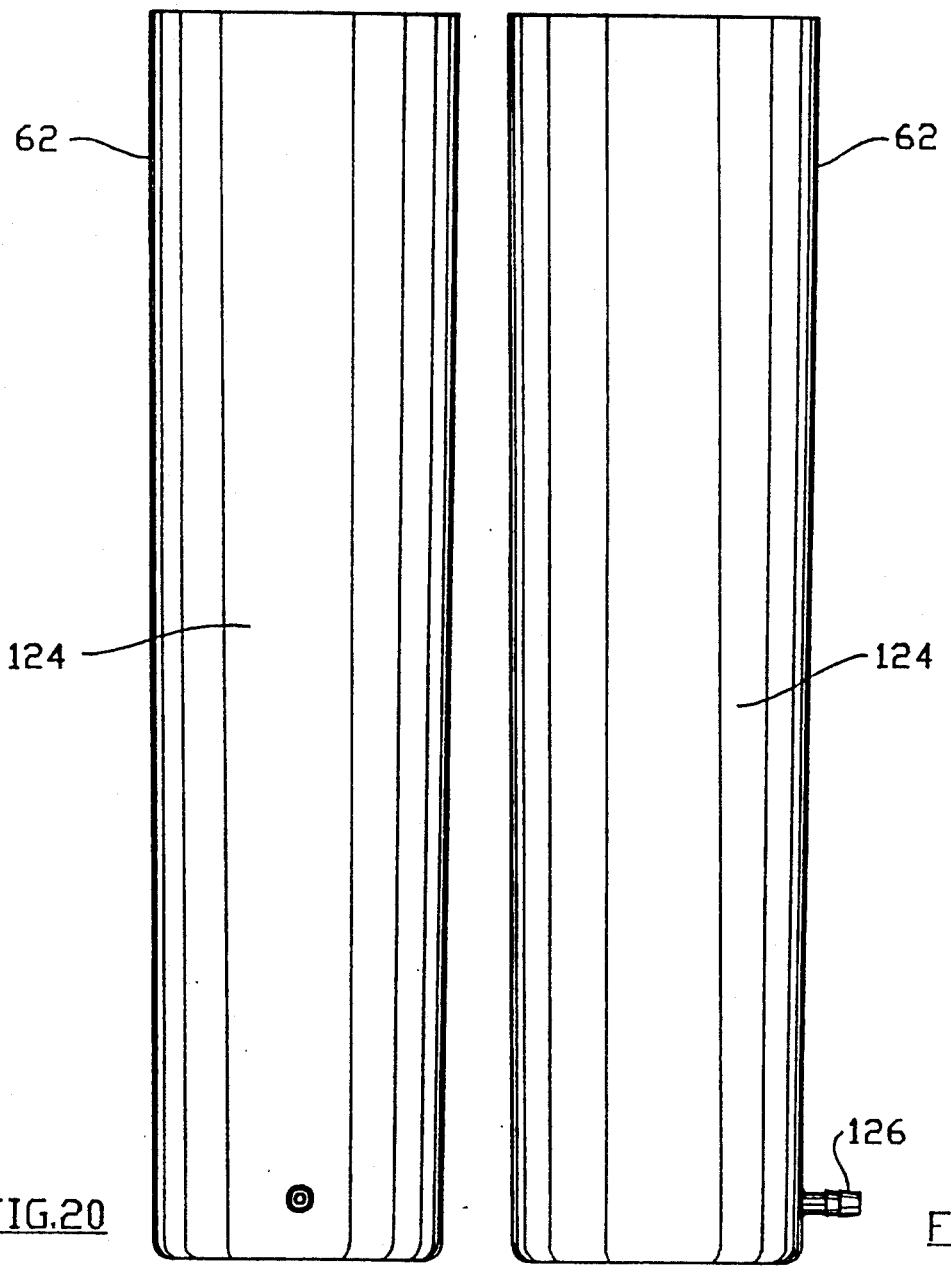

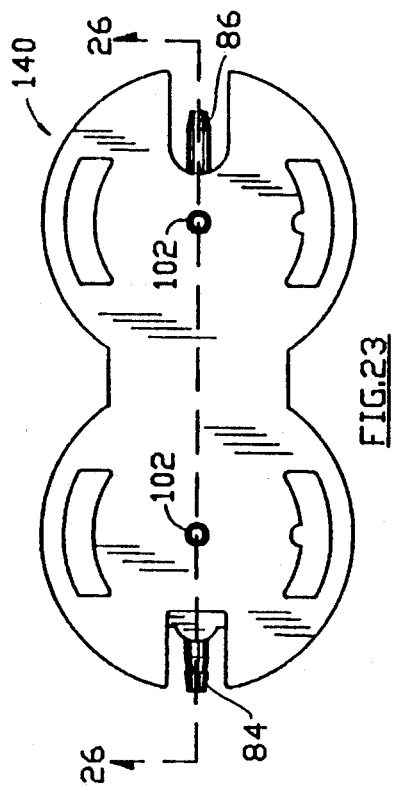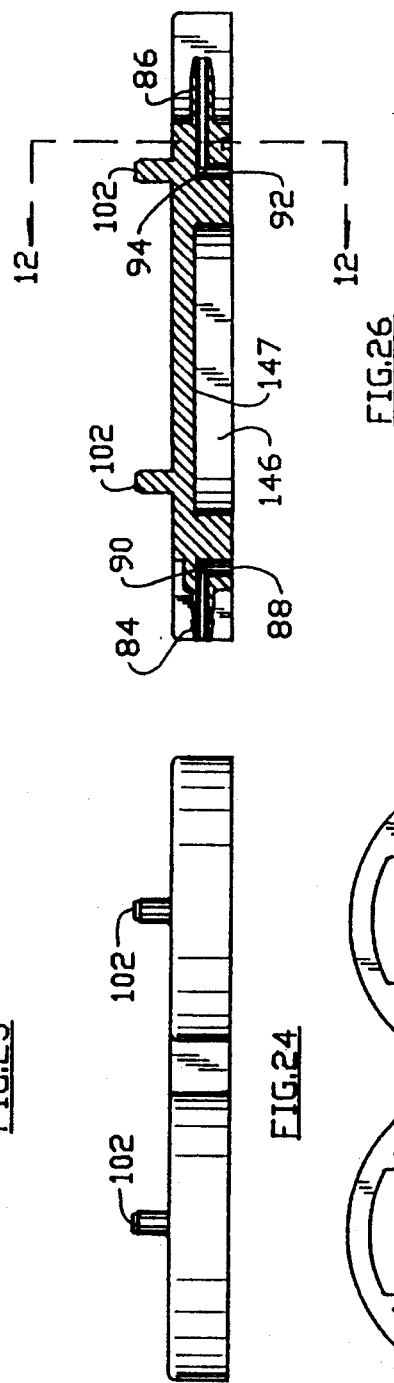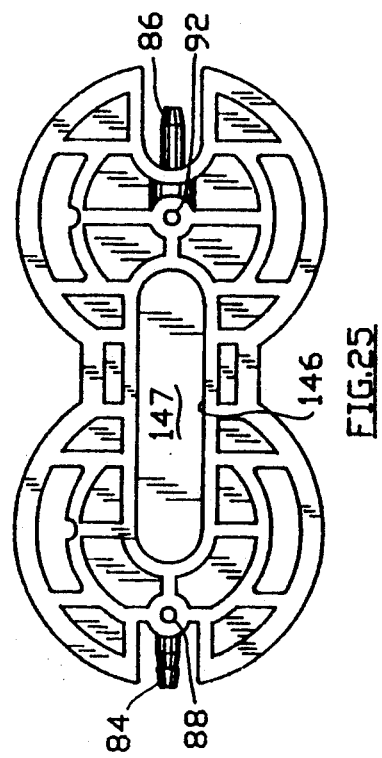

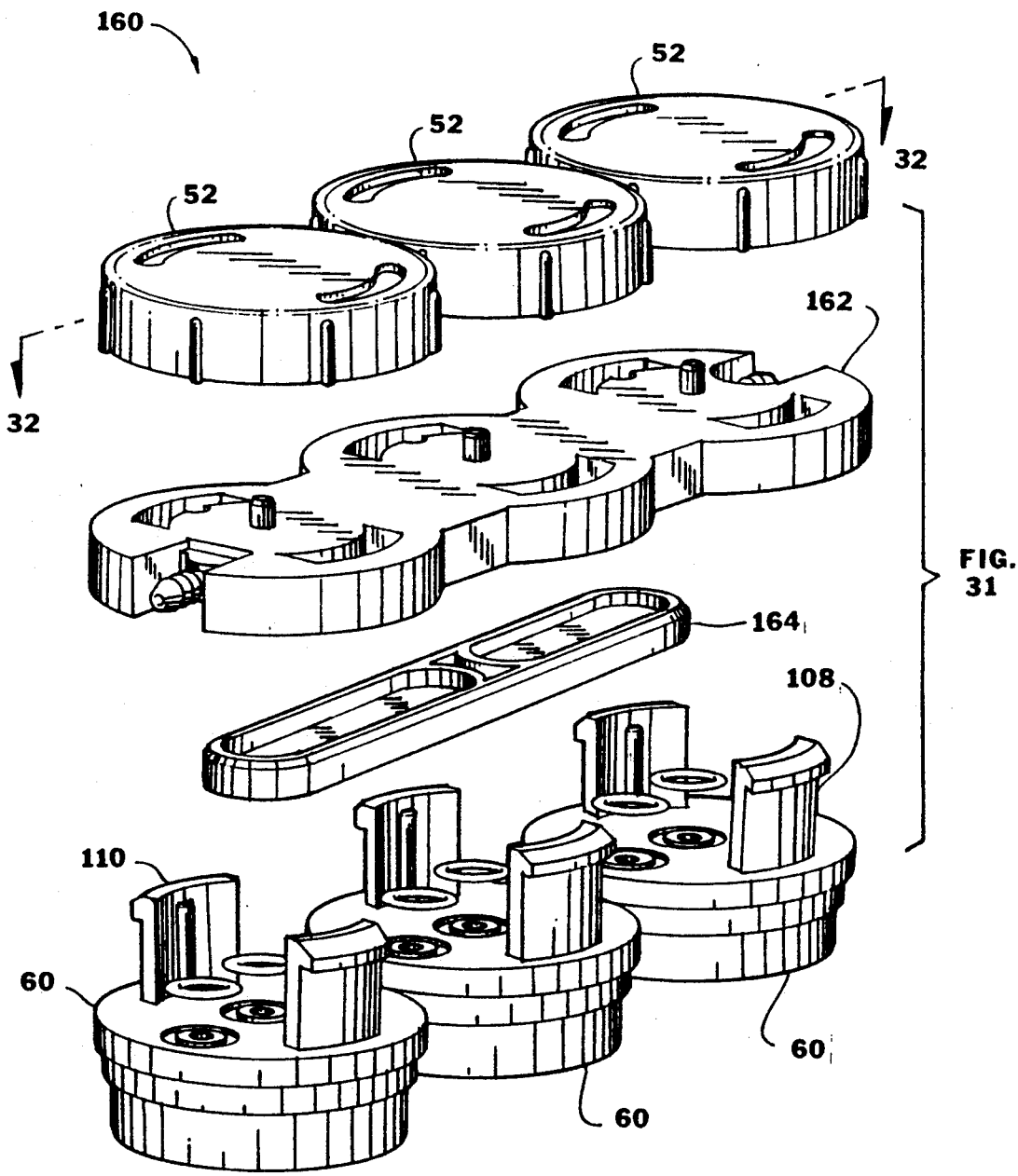

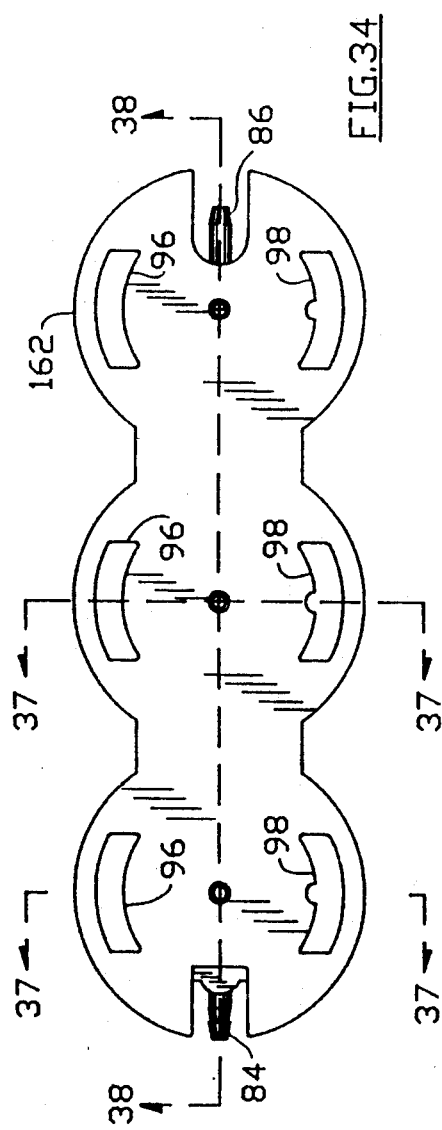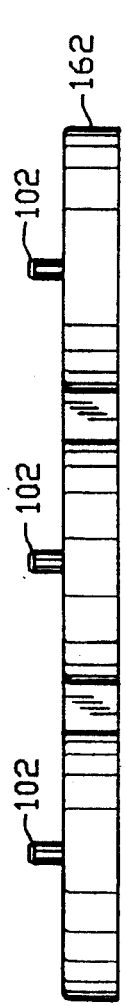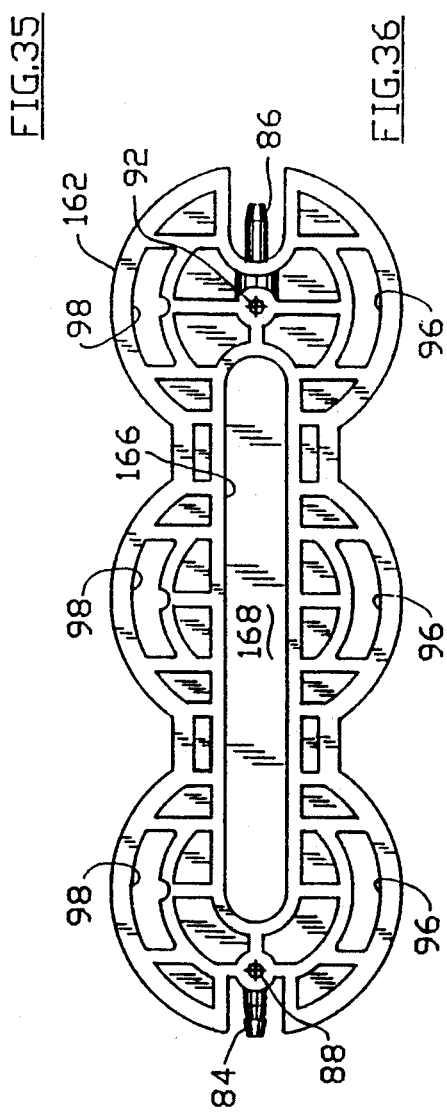

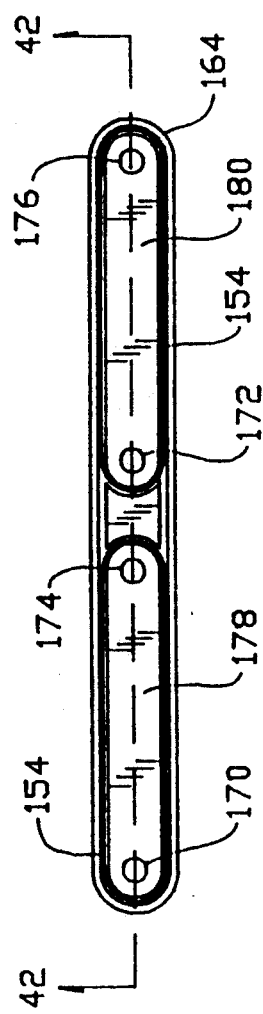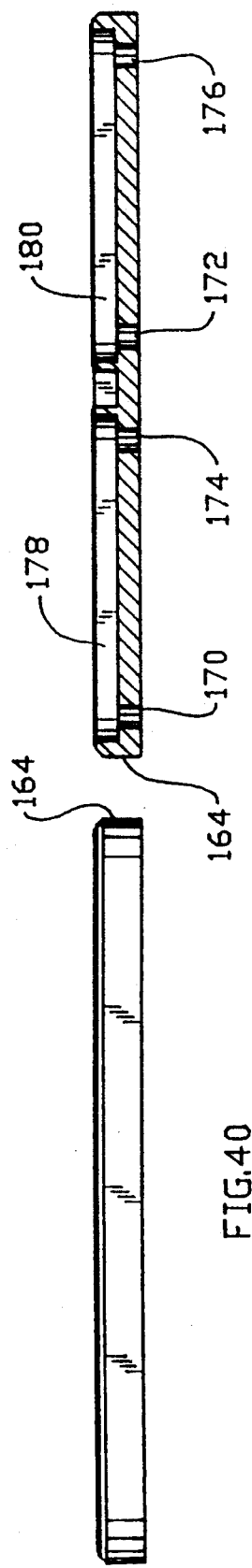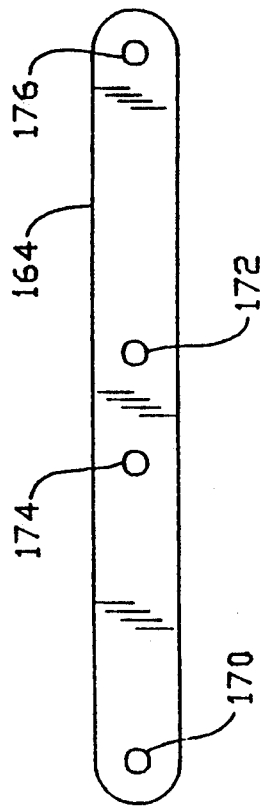

FILTER APPARATUS AND DISTRIBUTOR PLATE THEREFOR

BACKGROUND OF THE INVENTION

This invention is directed to a filter apparatus and distributor plate therefor therefor suitable for use with quick change filter canisters. The distributor plates of this invention can be used with one, two, three or more filter canisters arranged in series flow relationship to each other. One particular use of the filter apparatuses and distributor plates of this invention are for drinking water filtration including coin operated vending machines for drinking water, as well as residential and commercial use.

U.S. Pat. No. 4,735,716 discloses an filter apparatus having a head adaptable for permanent installation in a fluid or water dispensing machine and a disposable canister therefor. Embodiments are disclosed for one or more canisters. The canisters contain an axially positioned neck which contains ports into and out of the canister. Various filtration cartridges can be installed permanenetly within the canisters. The heads contain flanges which quick couple with corresponding flanges in the periphery of the canisters. U.S. Pat. No. 4,735,716 is hereby incorporated herein by reference and the reader is directed to the state of art and prior art discussed therein.

SUMMARY OF THE INVENTION

It is an object of the invention to provide a filter apparatus having a distributor plate which can be easily and inexpensively fabricated. The filter apparatus of this invention is of the quick-change canister type in which replacement filtration canisters containing various filter media cartridges or reverse osmosis modules can can be quickly installed.

It is also an object of this invention is to provide a distributor plate which can easily accommodate one, two, three or more of such canisters.

Another object of this invention is to provide a filter apparatus and distributor plate therefor which can be mass produced from plastic by injection molding. This is accomplished in this invention by distributor plates which are plate-like in shape and which do not have nor require flanges for coupling to the canister or canisters. This objective is also accomplished by canisters which do not have nor require necks and especially necks containing ports and port seals on such necks.

Still another object of this invention is to provide a filter apparatus the components of which, except for the port seals and filtration media or membrane, can be produced from plastic by injection molding.

Accordingly there is provided by the principles of this invention a filter apparatus comprising a canister, a distributor plate, a locking knob and a sealing means. The canister has a flat top surface and extending therebelow an external surface. Two separated upstanding members extend from the flat top surface of the canister. Each upstanding member has at its distal end a radially extending canister flange. The flat top surface also has first and second ports in communication with the interior of the canister. The second port is spaced away from the first port. It should be noted that the flat top surface of the canister is not required to have a neck. Thus in this invention the canister is neckless thereby reducing fabrication cost.

The distributor plate has top and bottom surfaces, an inlet, an outlet, a first port in communication with inlet, and a second port in communication with the outlet. The first and second ports are in the bottom surface of the distributor plate. The distributor plate has an opening for each upstanding extending memeber of the canister, and each opening extends from the bottom surface to the top surface of the distributor plate. When the apparatus is assembled, the bottom surface of the distributor plate faces the flat top surface of the canister and the canister flange on each upstanding member extends beyond and are separated a predetermined distance from the top surface of the distributor plate. The first ports of the canister and the distributor plate are opposed, and likewise the second ports of the canister and the distributor plate are opposed. It should be noted that the distributor plate is not required to have a flange. Thus in this invention the distributor plate is flange. Thus in this invention the distributor plate is plate is flangeless.

The filter apparatus further comprises seal means for (1) maintaining the first port of the distributor plate in sealed fluid communication with the first port of the canister and (2maintaining the second port of the distributor plate in sealed fluid communication with the second port of the canister.

The locking knob has a radially extending knob flange for opposing each canister flange. Each knob flange is operable for locking to one of the canisiter flanges by rotation of the locking knob relative to the canister, and for forcing the bottom surface of the distributor plate towards the flat top surface of the canister.

In one embodiment the distributor plate has a pin extending axially from the top surface of the distributor plate, and the locking knob has a pin recess for receiving the pin of the distributor plate.

The distributor plate has an external side surface extending between the top and bottom surfaces of the distributor plate, and in another embodiment the inlet and outlet of the distributor plate are in the external side surface thereof.

In still another embodiment the seal means comprises O-ring seals.

In one embodiment the canister and the distributor plate have means for requiring that the ports of the canister and the ports of the distributor plate be aligned in only one predetermined configuration. In a further embodiment one of the canister's upstanding extending members has an alignment member thereon, and one of the distributor plate's openings has a mating alignment member thereon. The alignment members are operable for insuring that the ports of the canister and the ports of the distributor plate be aligned in only one predetermined configuration. This prevents inadvertent assembly of the canister to the distributor plate.

In another embodiment of the invention the filter apparatus comprises a plurality of canisters arranged in series. In this embodiment the distributor plate has a predetermined opening for each upstanding extending member of each canister. Each predetermined opening extends from the bottom surface to the top surface of the distributor plate. When the apparatus is assembled, the bottom surface of the distributor plate faces the flat top surface of each canister and each canister flange on each upstanding extending member extends beyond and is separated a predetermined distance from the top surface of the distributor plate. In this embodiment a passageway is provided in the distributor plate for each adjacent canister pair, and each passageway has two ends which are open. The second port of each canister, except for the last canister, and one end of the passageway therefor are opposed. Likewise the first port of each canister, except for the first canister, and the other end of the passageway therefor are opposed. In this embodiment the seal means is for (1) maintaining the first port of the distributor plate in sealed fluid communication with the first port of the first one of the series of canisters, (2) maintaining the second port of the distributor plate in sealed fluid communication with the second port of the last one of the series of canisters, and (3) maintaining the two ends of each passageway in the distributor plate in sealed fluid communication with the second port and first port, respectively, of adjacent canisters. A locking knob is provided for each canister to secure and maintain the seal between the distributor plate and the canisters.

There is also provided by the principles of this invention a distributor plate for a filter apparatus. The distributor plate comprises a plate-like body having a predetermined thickness, a top surface and a bottom surface. The bottom surface is parallel to the top surface, and an external side surface extends between the top and bottom surfaces. The distributor plate has an inlet in the external side surface, and the inlet is connected to an inlet passageway within the distributor plate which is connected to a first port in the bottom surface of the distributor plate. The distributor plate has an outlet in the external side surface, and the outlet is connected to an outlet passageway within the disributor plate which is connected to a second port in the bottom surface of the distributor plate. The first port is not in fluid communication with the second port. The distributor plate has spaced apart arcuate openings for receiving therethrough the prong-like coupling members of a canister. Each opening extends from the bottom surface to the top surface of the distributor plate. In one embodiment the distributor plate has a first recess extending radially inwardly from the external side surface, and the inlet includes as inlet nipple located completely within the first recess. In another embodiment the distributor plate has a second recess extending radially inwardly from the external side surface, and the outlet includes an outlet nipple located completely within the second recess.

In still another embodiment the distributor plate is for a filter apparatus having a plurality of canisters arranged in series. In this embodiment the distributor plate further comprises an inter-passageway for each adjacent canister pair. Each inter-passageway has two ends. One end provides an inter-outlet port and the other end provides an inter-inlet port. The inter-passageway is completely within the distributor plate and the inter-outlet port and the inter-inlet port are in the bottom surface of the distributor plate. The first port is not in fluid communication with the second port, the inter-outlet port or the inter-inlet port. The second port is not in fluid communication with the inter-outlet port or the inter-inlet port.

In a further embodiment the distributor has a main body member and an insert member. The main body member has a central recess in the bottom surface thereof. The top surface, the inlet, the outlet, the first port, the second port, and the openings of the distributor plate are part of the main body member. The insert member has a top and bottom surface and the top surface has a separate channel for each adjacent canister pair. In this embodiment the insert member is permanently installed in the central recess of the main body member. The channel of the insert member and a portion of the central recess of the main body member form the inter-passsageway for each adjacent canister pair.

In one embodiment of this invention the distributor plate is made from plastic by molding. In another embodiment the locking knob is made from plastic by molding. In still another embodiment the body of the canister is made from plastic by molding.

In yet a further embodiment the main body member and the insert member of the distributor plate are made from a plastic material by molding and the insert member is permanently bonded to the main body member by plastic sonic welding of the plastic parts.

In one emboiment the molding of the components of the filter apparatus is by injection molding.

BRIEF DESCRIPTION OF THE DRAWINGS

FIG. 1 is an explosive top perpective view of components of the filter apparatus of the invention having but one filter canister.

FIG. 2 is a top plan view of the locking knob of FIG. 1.

FIG. 3 is a right side elevational view of the locking knob of FIG. 2, the left side elevation view thereof being identical.

FIG. 4 is bottom plan view of the locking knob of FIG. 2.

FIG. 5 is an elevational view in cross section taken through line 5—5 of FIG. 2.

FIG. 6 is a detail elevational view in cross section taken through line 6—6 of FIG. 4.

FIG. 8 is a top plan view of the distributor plate of FIG. 7.

FIG. 9 is a front side elevational view of the distributor plate of FIG. 8, the back side elevation view thereof being identical.

FIG. 10 is bottom plan view of the distributor plate of FIG. 8.

FIG. 11 is an elevational view in cross section taken through line 11—11 of FIG. 8.

FIG. 12 is a detail elevational view in cross section taken through line 12—12 of FIG. 11.

FIG. 13 is a top plan view of the canister closure member of FIG. 1.

FIG. 14 is a front side elevational view of the canister closure member of FIG. 13, the back side elevational view thereof being identical.

FIG. 15 is a right side elevational view of the canister closure member of FIG. 13, the left side elevational view thereof being identical.

FIG. 16 is bottom plan view of the canister closure member of FIG. 13.

FIG. 17 is an elevational view in cross section taken through line 17—17 of FIG. 13.

FIG. 18 is a top plan view of the canister cup member of FIG. 1.

FIG. 19 is a front side elevational view of the canister cup member of FIG. 18, the back side elevational view being the mirror thereof.

FIG. 20 is a right side elevational view of the canister cup member of FIG. 18, the left side elevational view being identical except without the bottom tap port.

FIG. 23 is a top plan view of the main body member of a distributor plate intended for a filter apparatus having two canisters.

FIG. 24 is a front side elevational view of the main body member of FIG. 23, the back side elevational view being identical.

FIG. 25 is a bottom plan view of the distributor plate of FIG. 23.

FIG. 26 is an elevational view in cross section taken through line 26—26 of FIG. 23. The detailed cross sectional view through line 12—12 of FIG. 26 is identical to that of FIG. 12.

FIG. 31 is an explosive top perspective view of components of a filter apparatus having three canisters arranged in series.

FIG. 34 is a top plan view of a main body member of the distributor plate of FIG. 31.

FIG. 35 is a front side elevational view of the main body member of FIG. 34, the left side elevational view thereof being identical.

FIG. 36 is a bottom plan view of the main body member of FIG. 34.

FIG. 39 is a top plan view of an insert member of the distributor plate intended for assembly in the main body member of FIGS. 34-38.

FIG. 40 is a front side elevational view of the main body member of FIG. 39, the left side elevational view thereof being identical.

FIG. 41 is bottom plan view of the main body member of FIG. 39.

FIG. 42 is an elevational view in cross section taken through line 42—42 of FIG. 39.

DESCRIPTION OF THE PREFERRED EMBODIMENTS

Figure 7:
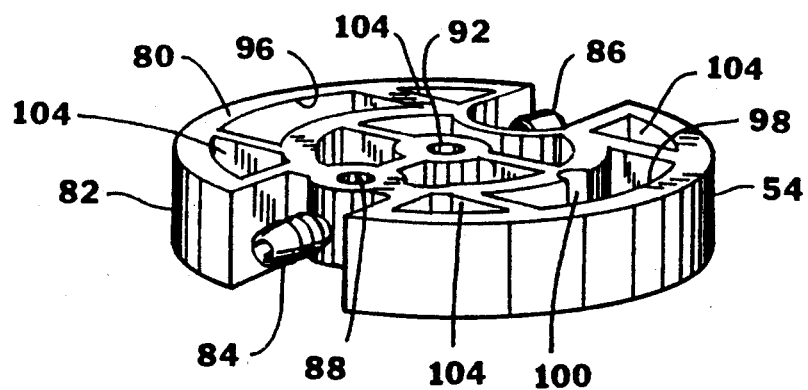
FIG. 7 is a bottom perspective view of the distributor plate of FIG. 1.
Figure 21:
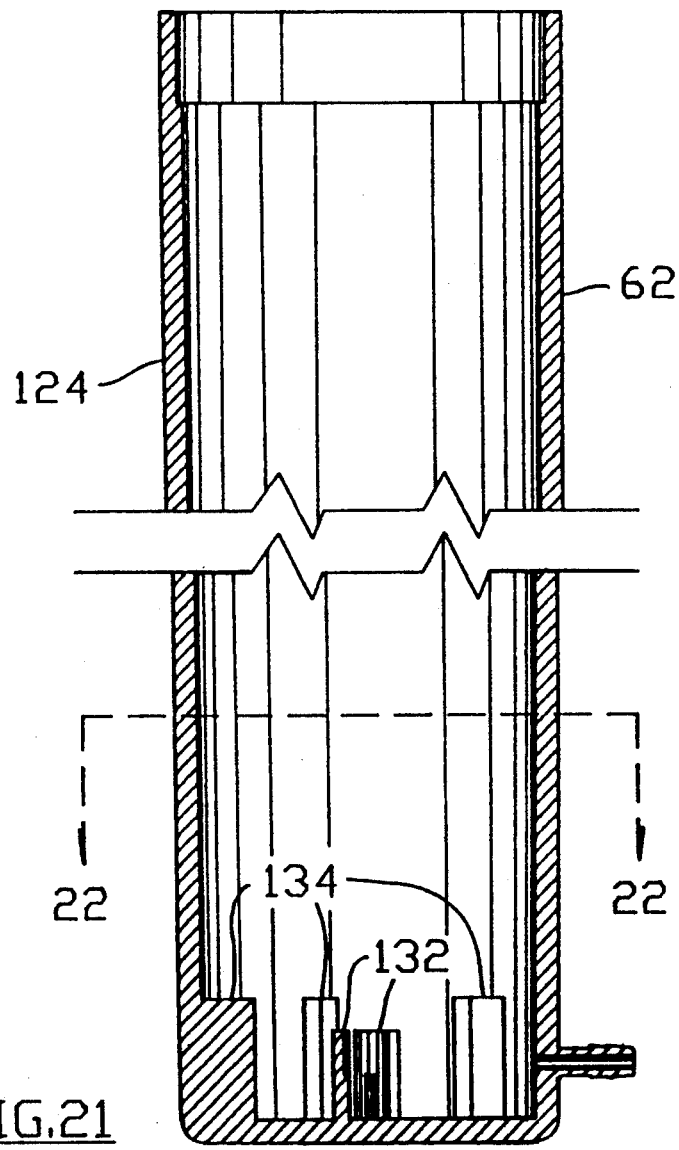
FIG. 21 is an elevational view in cross section taken through line 21—21 of FIG. 18.
Figure 22:
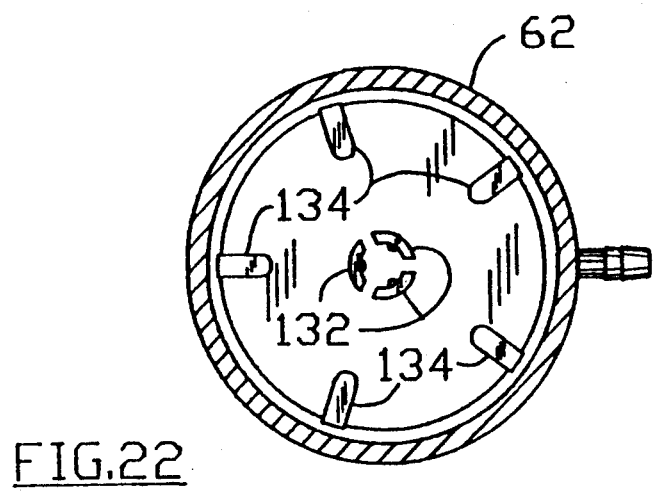
FIG. 22 is a detail view in cross section taken through line 22—22 of FIG. 21.
Figure 30:
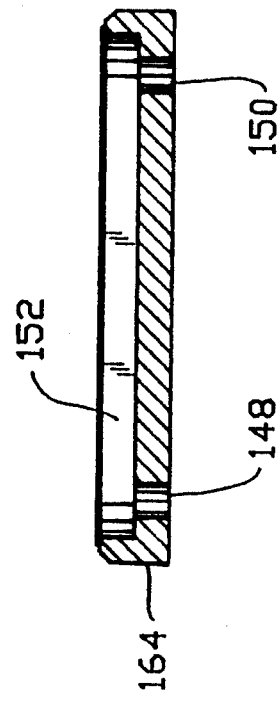
FIG. 30 is an elevational view in cross section taken through line 30—30 of FIG. 27.
Figure 27:
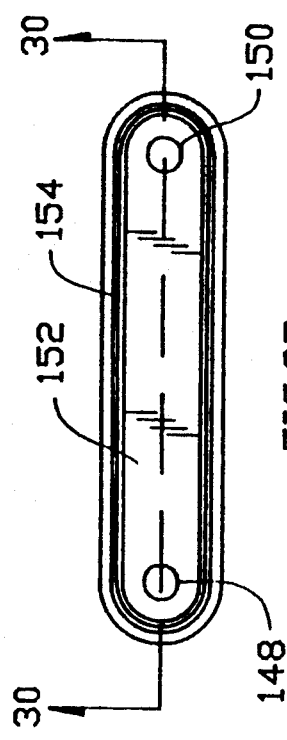
FIG. 27 is a top plan view of the insert member of a distributor plate intended for assembly in the main body memeber of FIGS. 23-26.
Figure 28:
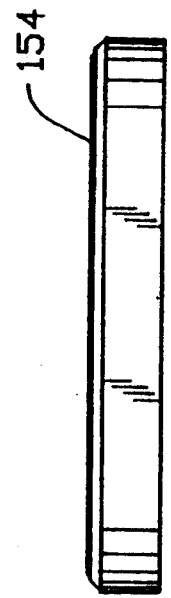
FIG. 28 is a front side elevational view of the insert member of FIG. 27, the back side elevational view being identical.
Figure 29:
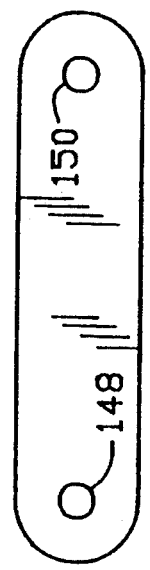
FIG. 29 is a bottom plan view of the insert member of FIG. 27.

Several preferred embodiments of this invention will be described by reference to the figures. Like elements in various figures will bear like element numbers throughout the figures unless there is reason to particularly distinguish an element of a particular figure. One embodiment of this invention is directed towards a filter apparatus, illustrated by FIG. 1 and generally designated by numeral 50, comprising locking knob 52, distributor plate 54, canister 56 and O-rings 58. Canister 56 comprises canister closure member 60 and canister cup member 62. With the exception of the O-rings, the above-mentioned component parts are preferably made of a plastic material and preferably made by molding, especially injection molding.

Referring to FIGS. 2-6, locking knob 52 is preferably cylindrical and has two inwardly radially extending flanges 64 each of which contain ramp portion 66, locking section 68 and stop 70. Preferably locking knob 52 also contains an axially positioned internal pin recess 72 to facilitate alignment and locking to distributor plate 54, gripping ribs 74 to facilitate hand turning of the locking knob and arcuate openings 76 to facilitate injection molding.

Referring to FIGS. 7-12, distributor plate 54 is preferably cylindrical and has a flat top surface 78, parallel thereto a flat bottom surface 80, and extending therebetween external side surface 82. Distributor plate further comprises inlet nipple 84 which provides an inlet for fluid into the distributor plate and into the filter apparatus, outlet nipple 86 which provides an outlet for fluid out of the distributor plate and out of the filter apparatus. Distributor plate also contains a port 88, sometimes referred to herein as the first port, in the bottom surface 80 which is in communication with internal passageway 90 which is in communication with inlet nipple 84, and a port 92, sometimes referred to herein as the second port, in the bottom surface 80 which is in communication with internal passageway 94 which is in communication with outlet nipple 86 as readily seen by FIG. 11. First port 88 and second port 92 are spaced apart from each other in bottom surface 80 and not in direct communication with each other. Inlet and outlet nipples 84 and 86 are not in communication with each other and are preferably diametrically opposite each other in the external side surface 82. Distributor plate 54 further comprise arcuate openings 96 and 98 which extend from top surface 78 to bottom surface 80. Arcuate opening 98 preferably contains alignment member or grove 100 which serves to restrict the assembly of the canister in the filter apparatus in only one orientation as will be explained more fully when describing the canister.

Distributor plate 54 preferably contains pin 102 which extends axially beyond top surface 78 and which is received in pin recess 72 of locking knob 52 thereby providing means for facilitating alignment and locking of the locking knob and the distributor plate. The bottom surface 80 of distributor plate also comprises a number of recesses 104 the purpose of which is to reduce material and production cost, promote dimensional stability of the finished product, facilitate fabrication by injection molding, and/or reduce the weight of the product.

Canister 56 comprises canister closure member 60 shown in detail in FIGS. 13-17 and canister cup member 62 shown in detail in FIGS. 18-22. Canister cup member is charged with a predetermined filter cartridge or module such as a conventional activated carbon cartridge, an ion exchange cartridge, or a module containing a reverse osmosis membrane, none of which are shown in the figures. Thereafter canister closure member 60 is bonded to canister cup member 62 preferably by conventional electromagnetic welding thereby permanently confining the filter cartridge or module within the canister and forming an unitary canister.

Canister closure member 60 comprises flat top surface 106, two separated upstanding members 108 and 110 which extend from and above flat top surface 106. Upstanding members 108 and 110 have at thier distal end 112 an outwardly radially extending flange 114 for engaging with and locking to the inwardly radially extending flanges 64 of locking knob 52. Preferably one of the upstanding extending members comprises an alignment member or rib 116 which restricts assembly of the canister to the distributor plate so that upstanding extending member 110 can only be inserted into arcuate opening 98 which contains alignment member or groove 100 and can not be inserted into arcuate opening 96.

The flat top surface 106 of canister closure member 60 comprises port 118, sometimes referred to herein as the first port, and port 120, sometimes referred to herein as the second port. Ports 118 and 120 are spaced away from each other. Preferably surrounding each port is an O-rings grove 122 which serves to provide a seat for O-rings 58.

When the canister closure member 60 is bonded to the canister cup member 62 external surface 124 of the unitary canister 56 extends below flat top surface 106. External surface 124 can comprise a third port 126 generally in the bottom portion thereof for purposes of removing material separated by the canister, for example the brine separated by a reverse osmosis membrane. Preferably canister closure member 60 and canister cup member 62 comprise several alignment members and/or support brackets 128, 130, 132 and 134 for positioning the filter cartridge or module within the canister so that ports 118 and 120 direct the fluid to and from such filter cartridge or module as desired.

Since filter apparatuses are often required to perform several filteration or fluid treatments of various types, filter apparatuses often require several types of canisters. FIGS. 23-30 illustrate another embodiment of this invention, generally designated by numeral 140, having a distributor plate which will accommodate two canisters arranged in series. By "arranged in series" as that expression is used herein is meant that fluid passes in series flow through one filter canister to the next adjacent canister and so on to the last of the canisters. The series flow is accomplished in this invention by the distributor plate. The distributor plate of embodiment 140 comprises main body member 142 and insert member 144. Main body member 142 comprises inlet nipple 84, passageway 90, first port 88, outlet nipple 86, passageway and second port 92 all of which are similar and serve the same purpose as described with regard to embodiment 50. Main body member 142, however, also contains insert recess 146 which is configured and adapted to received insert member 144. Recess 146 contains flat recess surface 147.

Insert member 144 comprises port 148, sometimes referred to herein as an inter-outlet port, port 150, sometimes referred to herein as an inter-inlet port, and channel 152 which serves as passageway providing fluid communication between inter-outlet port 148 and inter-inlet port 150. Preferably insert member 144 also contains a fusible material 154 in the top surface of the insert member which surrounds ports 148 and 150 and channel 152. When assembling the insert member in the main body member, fusible material 154 is abutted against recessed surface 147 of main body member 142 and the assembly is subjected to conventional sonic welding thereby permanently fastening the insert member to the main body member and thereby forming an unitary distributor plate useful for a filter apparatus requiring two canisters.

FIGS. 31-43 illustrate another embodiment of this invention, generally designated by numeral 160, having a distributor plate which will accommodate three canisters arranged in series. As with embodiment 140, the series fluid flow is accomplished by the distributor plate. The distributor plate of embodiment 160 comprises main body member 162 and insert member 164. Main body member 162 comprises inlet nipple 84, passageway 90, first port 88, outlet nipple 86, passageway 94 and second port 92 all of which are similar and serve the same purpose as described with regard to the previously described embodiments. Main body member 162 also contains insert recess 166 which is configured and adapted to received insert member 164. Recess 166 contains flat recess surface 168.

Figure 43:
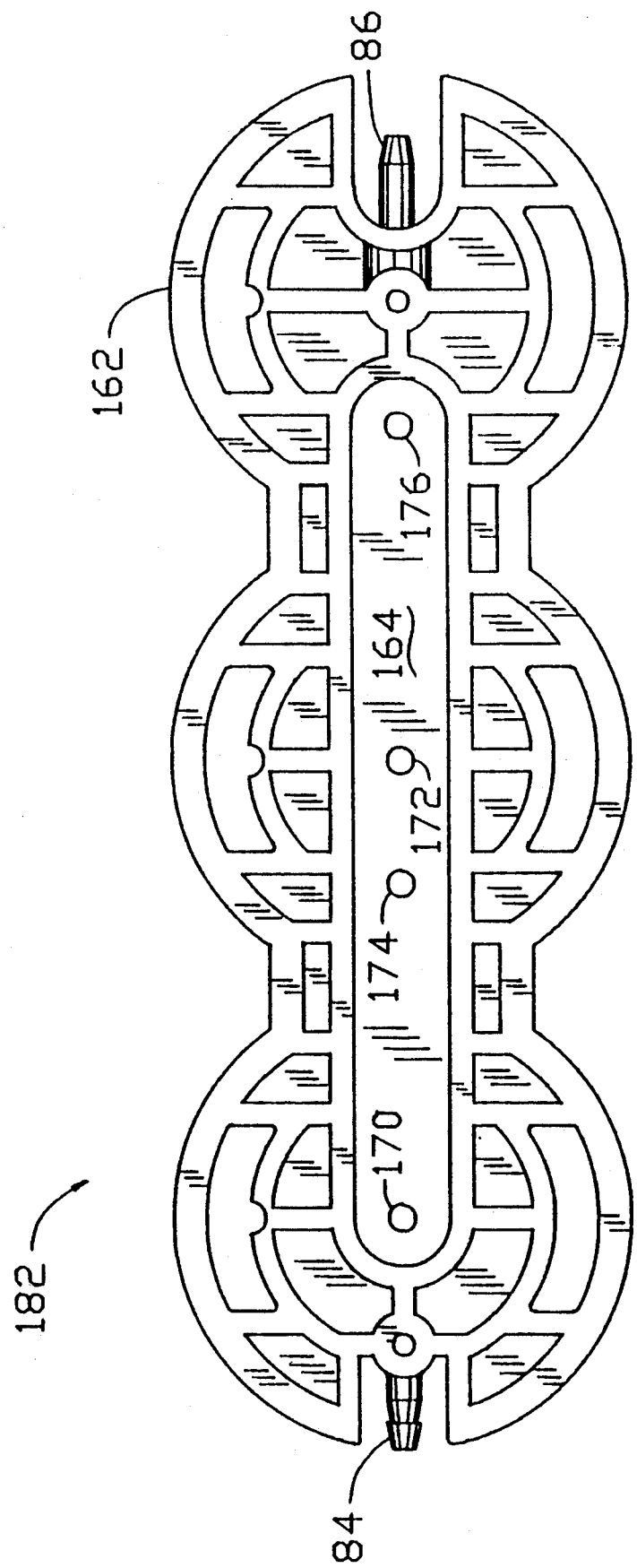
FIG. 43 is bottom plan view of the insert member shown in FIG. 41 permanently bonded to the main body member shown in FIG. 36.

Insert member 164 comprises ports 170 and 174, sometimes referred to herein as inter-outlet ports, ports 174 and 176, sometimes referred to herein as inter-inlet ports, and channels 178 and 180 which serves as inter-passageways providing fluid communication between adjacent inter-outlet port 170 and inter-inlet port 174, and between adjacent inter-outlet port 172 and inter-inlet port 176, respectively. Preferably insert member 164 also contains a fusible material 154 in the top surface of the insert member which surrounds adjacent ports 170 and 174 and adjacent ports 172 and 176. When assembling the insert member in the main body member, fusible material 154 is abutted against surface 168 of main body member 162 and the assembly is subjected to conventional sonic welding thereby permanently fastening the insert member to the main body member and thereby forming an unitary distributor plate useful for a filter apparatus requiring three canisters. A bottom plan view of the unitary distributor plate 182 is shown in FIG. 43.

Figure 32:
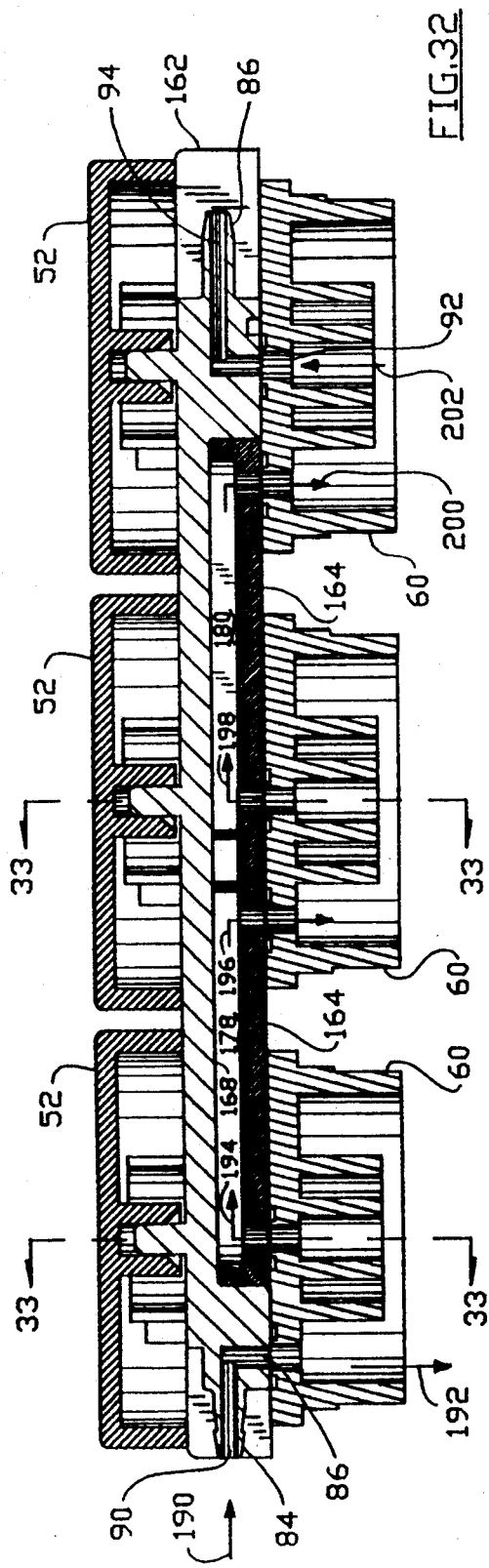
FIG. 32 is an elevational view in cross section of the assembled components of FIG. 31 taken in the direction of line 32—32 of FIG. 31.

To illustrate the series flow through embodiment 160 reference is made to FIG. 32 which is an enlarged elevational view in cross section taken in the direction of line 32—32 of FIG. 31, which can be seen to include the axis of the three canisters. The canister cup members have been omitted from FIG. 32 for purposes of emphasizing other details. Fluid flow into the filter apparatus is shown by arrow 190, which then enters the first canister as shown by arrow 192, exits the first canister as shown by arrow 194 into the first channel 178. The fluid then enters the second canister as shown by arrow 196, and exits therefrom as shown by arrow 198 into the second channel 180. The fluid then enters the third canister as shown by arrow 200, and exits therefrom as shown by arrow 202 into the outlet nipple 86.

Figure 33:
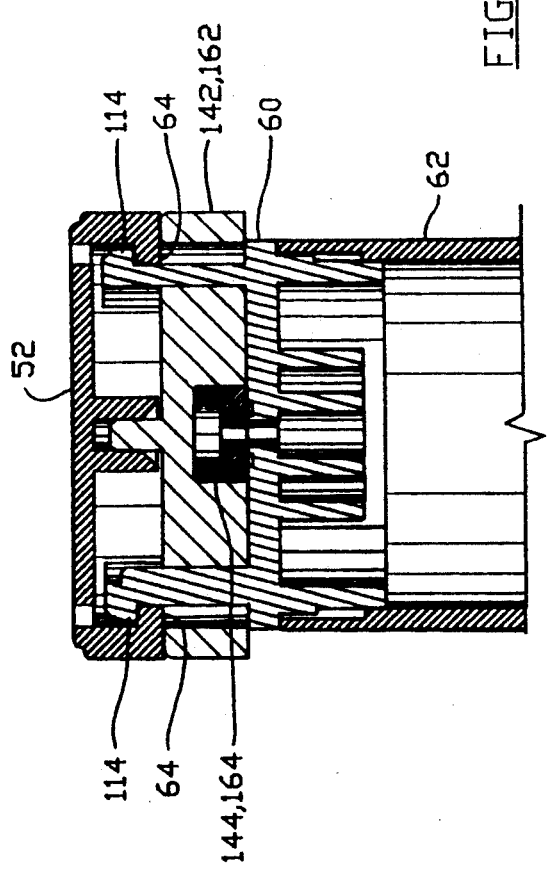
FIG. 33 is an elevational view in cross section as seen through lines 33—33 of FIG. 32. When the components of FIG. 1 are assembled, the elevational view in cross section as seen in the direction of line 33—33 of FIG. 1 is identical to FIG. 33.
Figure 37:
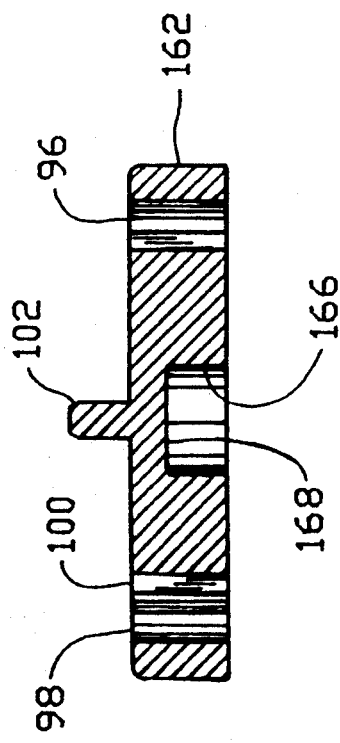
FIG. 37 is an elevational view in cross section taken through lines 37—37 of FIG. 34.
Figure 38:
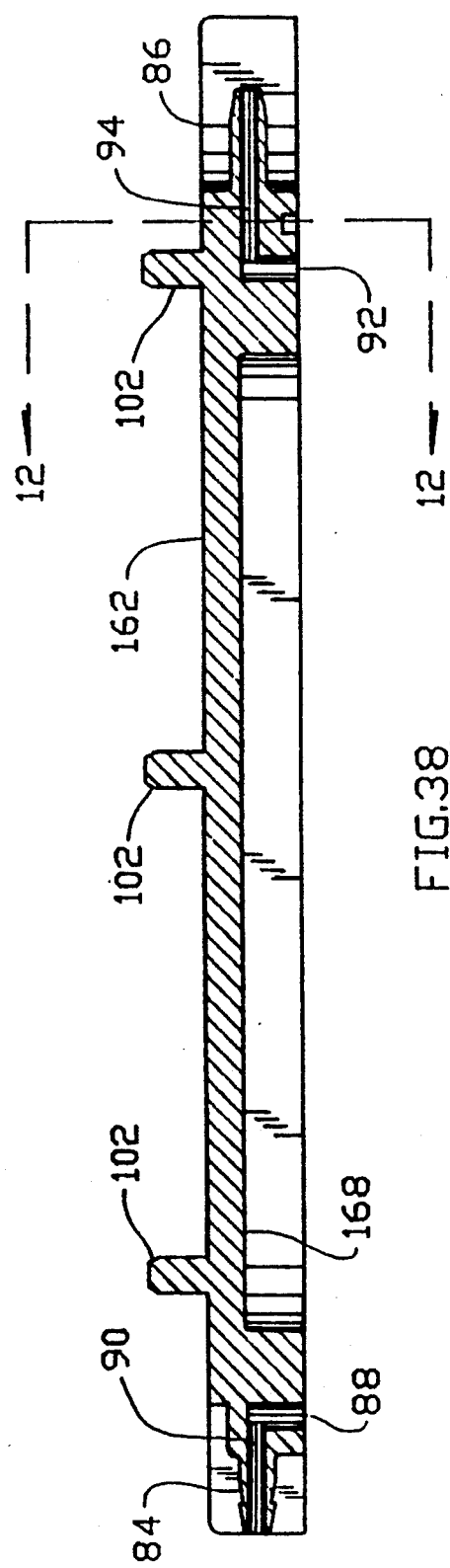
FIG. 38 is an elevational view in cross section taken through line 38—38 of FIG. 34. The detailed cross sectional view through line 12—12 of FIG. 38 is identical to that of FIG. 12.

Arrangement of the components through the axis of the first two canisters, perpendicular to the plane of view shown in FIG. 32, is shown in FIG. 33. FIG. 33 illustrates how the outwardly radially extending flanges 114 of the main body member engage and lock with the inwardly radially extending flanges 64 of the locking knob. As can be seen, the locking knobs are identical and interchangeable. The canisters, except for the filter cartridge or modules contained within the canister, are identical and interchangeable, however, because of there is usually a preferably arrangement of the various canisters due to their intended function, such canisters are usually arranged in a predetermined sequence such as prefilter canister to remove large particles, followed by a reverse osmosis canister and lastly by an activated carbon canister.

It can be further appreciated that distributor plate can be made which can accommodate any number of canisters, i.e. four or five or more if desired simply by increasing then length of the main body member, the insert member and the number of adjacent inter-outlet and inter-inlet ports and channels in the insert member.

It should be noted that the canisters of this invention are neckless, that is the canisters do not contain a neck which extends above the flat top surface 106. Such necks generally contain ports which require seals on the cylindrical surface of the neck. Such seals must usually be slid into a corresponding cylindrical recess in a mating component. The sliding of seals, for example O-rings seals on neck members, into cylindrical recesses can abrade and damage such seals depending on the roughness of the surface. This problem does not arise in this invention.

It should also be noted that the distributor plates of this invention are flangeless, that is the distributor plates do not contain flanges for locking onto the canister. Rather in this invention the flanges for holding the canisters are contained completely in the locking knob. This is important improvement because it prevents wear on the more expensive component the distributor plate and transfers such wear to the lesser expensive component the locking knob.

Still further it should be noted that the relatively flat construction of the distributor plate and the locking knob permit these components to be more cheaply and easily manufactured than components which require flanges on the distributor plates and necks on the canisters.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and embodiments of this invention described herein are for purposes of illustrations and example and that modifications and improvements may be made thereto without departing from the spirit of the invention or from the scope of the claims. The claims, therefore, are to be accorded a range of equivalents commensurate in scope with the advances made over the art.

What is cliamed is:

1. A filter apparatus comprising:
   a canister having a flat top surface and extending therebelow an external surface, two separated upstanding members extending from the flat top surface, each member having at the distal end thereof a radially extending canister flange, the flat top surface also having first and second ports in communication with the interior of the canister, the second port being spaced away from the first port; filter means disposed in the canister;
   a distributor plate having top and bottom surfaces, an inlet and an outlet, a first port in communication with the inlet, a second port in communication with the outlet, the first and second ports being in the bottom surface of the distributor plate, the distributor plate also having an opening for each upstanding extending member of the canister, each opening extending from the bottom surface to the top surface of the distributor plate, wherein, when the apparatus is assembled, the bottom surface of the distributor plate faces the flat top surface of the canister and the canister flange on each upstanding extending member extends beyond and is separated a predetermined distance from the top surface of the distributor plate, the first ports of the canister and the distributor plate are opposed and the second ports of the canister and the distributor plate are opposed;
   seal means for maintaining the first port of the distributor plate in sealed fluid communication with the first port of the canister and maintaining the second port of the distributor plate in sealed fluid communication with the second port of the canister; and
   a locking knob having a radially extending knob flange for opposing each canister flange, each knob flange being operable for locking to on of the canister flanges by rotation of the locking knob relative to the canister, and for forcing the bottom surface of the distributor plate towards the flat top surface of the canister.

2. The filter apparatus of claim 1, wherein the flat top surface of the canister is neckless.

3. The filter apparatus of claim 1,
   wherein the distributor plate further comprises a pin extending axially from the top surface of the distributor plate, and
   wherein the locking knob further comprises a pin recess for receiving the pin of the distributor plate.

4. The filter apparatus of claim 1,
   wherein the distributor plate has an external side surface extending between the top and bottom surfaces of the distributor plate, and
   wherein the inlet and outlet of the distributor plate are in the external side surface thereof.

5. The filter apparatus of claim 1, wherein the seal means comprises O-ring seals.

6. The filter apparatus of claim 1, wherein the distributor plate is flangeless.

7. The fliter apparatus of claim 1, wherein the canister and the distributor plate further comprise means for requiring that the ports of the canister and the ports of the distributor plate can be aligned in only one predetermined configuration.

8. The filter apparatus of claim 1,
   wherein one the canister's upstanding extending members has an alignment member thereon, and
   wherein one of the distributor plate's openings has an alignment member thereon, the alignment members being operable for allowing the ports of the canister and the ports of the distributor plate to be aligned in only one predetermined configuration.

9. A filter apparatus comprising:
   a plurality of canisters arranged in series, each canister having a flat top surface and extending therebelow an external surface, two separated upstanding members extending from the flat top surface, each member having at the distal end thereof a radially extending canister flange, the flat top surface also having first and second ports in communication with the interior of the canister, the second port being spaced away from the first port;

filter means disposed in each canister;

a distributor plate having top and bottom surfaces, an inlet and an outlet, a first port in communication with the inlet, a second port in communication with the outlet, the first and second ports being in the bottom surface of the distributor plate, the distributor plate also having an opening for each upstanding extending member of each canister, each opening extending from the bottom surface to the top surface of the distributor plate, wherein, when the apparatus is assembled, the bottom surface of the distributor plate faces the flat top surface of each canister and each canister flange on each upstanding extending member extends beyond and is separated a predetermined distance from the top surface of the distributor plate, the first port of the first one of the series of canisters and the first port of the distributor plate are opposed and the second of the last one of the series of canisters and the second port of the distributor plate are opposed, a passageway in the distributor plate for each adjacent canister pair, the passageway having two ends which are open, the second port of each canister, except for the last canister, and one of said two ends of the passageway therefore are opposed, the first port of each canister, except for the first canister, and the other one of said two ends of passageway therefore are opposed;

seal means for maintaining the first port of the distributor plate in sealed fluid communication with the first port of the first one of the series of canisters, maintaining the second port of the distributor plate in sealed fluid communication with the second port of the last one of the series of canisters, and maintaining the two ends of each passageway in the distributor plate in sealed fluid communication with the second port and first port, respectively, of such adjacent canister pair; and a locking knob for each canister, each locking knob having a radially extending knob flange for opposing each canister flange, each knob flange being operable for locking to one of the canister flanges by rotation of the locking knob relative to the canister, and for forcing the bottom surface of the distributor plate towards the flat top surface of the canister.

10. The filter apparatus of claim 9, wherein the flat top surface of each canister is neckless.

11. The filter apparatus of claim 9,
wherein the distributor plate further comprises a pin for each locking knob, each pin extending axially from the top surface of the distributor plate, and
wherein each locking knob further comprises a pin recess for receiving the pin of the distributor plate.

12. The filter apparatus of claim 9, wherein the distributor plate has an external side surface extending between the top and bottom surfaces of the distributor plate, and
wherein the inlet and outlet of the distributor plate are in the external side surface thereof.

13. The filter apparatus of claim 9, wherein the seal means comprises O-ring seals.

14. The filter apparatus of claim 9, wherein the distributor plate is flangeless.

15. The filter apparatus of claim 9, wherein the distributor plate and the locking knob are made from a plastic material by molding.

16. A distributor plate for a filter apparatus, the filter apparatus having a canister, filter means disposed in such canister, wherein such canister has a flat top surface and two separated upstanding arcuate prong-like coupling members extending from the flat top surface, the flat top surface of such canister having two ports in communication with the interior of the canister, the distributor plate comprising:

a plate-like body having a predetermined thickness, a top surface and a bottom surface, the bottom surface being parallel to the top surface, and an external side surface extending between the top and bottom surfaces;

an inlet in the external side surface, the inlet being connected to an inlet passageway within the distributor plate which is connected to a first port in the bottom surface of the distributor plate;

an outlet in the external side surface, the outlet being connected to an outlet passageway within the distributor plate is connected to a second port in the bottom surface of the distributor plate, the first port not being in fluid communication with the second port; and spaced apart arcuate openings for receiving the prong-like coupling members of such canister, each opening extending from the bottom surface to the top surface of the distributor plate.

17. The distributor plate of claim 16, further comprising:

a first recess extending radially from the external side surface, wherein the inlet includes an inlet nipple located completely within the first recess; and a second recess extending radially inwardly from the external side surface, the second recess being spaced away from the first recess, wherein the outlet includes an outlet nipple located completely within the second recess.

18. A distributor plate for a filter apparatus, the filter apparatus having a plurality of canisters arranged in series, filter means disposed in each of such canister wherein each of such canisters has a flat top surface and two separated upstanding arcuate prong-like coupling members extending from the flat top surface, the flat top surface of each of such canisters having two ports in communication with the interior of the canister, the distributor plate comprising:

a plate-like body having a predetermined thickness, a top surface and a bottom surface, the bottom surface being parallel to the top surface, and an external side surface extending between the top and bottom surfaces;

an inlet in the external side surface, the inlet being connected to an inlet passageway within the distributor plate which is connected to a first port in the bottom surface of the distributor plate;

an outlet in the external side surface, the outlet being connected to an outlet passageway within the distributor plate which is connected to a second port in the bottom surface of the distributor plate;

an inter-passageway for each adjacent canister pair, each inter-passageway having two ends, one of said two ends being an inter-outlet port and the other one of said two ends being an inter-inlet port, the inter-passageway being within the distributor plate, the inter-outlet port and the inter-inlet port being in the bottom surface of the distributor plate, the first port not being in fluid communication with the second port, the inter-outlet port or the inter-inlet port, the second port not being in fluid communication with the inter-outlet port or the inter-inlet port; and spaced apart arcuate openings for receiving the prong-like coupling members of such canisters, each opening extending from the bottom surface to the top surface of the distributor plate.

19. The distributor plate of claim 18, wherein the distributor plate comprises a main body member and an insert member, the main body member having a central recess in the bottom surface thereof, wherein the top surface, the inlet, the outlet, the first port, the second port, and the openings of the distributor plate are part of the main body member, the insert member having a top and bottom surface, the top surface of the insert member having a channel for each adjacent canister pair, the insert member being permanently installed in the central recess of the main body member, the channel of the insert member and a portion of the central recess of the main body member thereby forming the passageway for each adjacent canister pair.

20. The filter apparatus of claim 19, wherein the main body member and the insert member are made from a plastic material by molding and the insert member is permanently bonded to the main body member by sonic welding.

* * * * *